Figure 1:
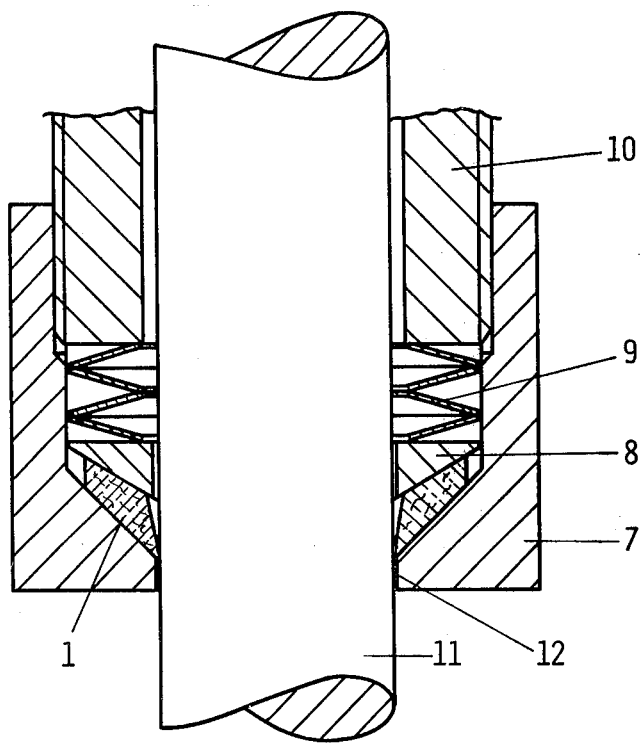

United States Patent [19]

Bergman

[11] 4,170,363
[45] Oct. 9, 1979

[54] OIL SCRAPER

[75] Inventor: Ulf C. Bergman, Malmo, Sweden

[73] Assignee: Kommanditbolaget United Stirling (Sweden) AB & Co., Malmo, Sweden

[21] Appl. No.: 702,185

[22] Filed: Jul. 2, 1976

[51] Int. Cl.² ............................................. F16J 15/18
[52] U.S. Cl. ...................................... 277/24; 277/116
[58] Field of Search ................... 277/117, 116, 237, 24

[56] References Cited

U.S. PATENT DOCUMENTS

| 1,546,525 | 7/1929 | Wasson | 277/236 |
| 2,288,263 | 6/1942 | Bostwick | 277/118 |
| 3,567,258 | 3/1969 | Scaramucci | 277/236 |
| 3,879,044 | 4/1975 | Estes | 277/DIG. 6 |
| 3,995,868 | 12/1976 | Smith | 277/DIG. 6 |

FOREIGN PATENT DOCUMENTS 1283171  12/1961  France ...................... 277/236

*Primary Examiner*—Robert I. Smith
*Attorney, Agent, or Firm*—Laurence R. Brown

[57] ABSTRACT

A scraper ring for removing oil from a piston rod is made of plastic and comprises conical surfaces defining a smallest diameter edge for contact with the piston rod. The ring is axially loaded with Belleville springs and a mating support ring bearing on the scraper ring.

3 Claims, 2 Drawing Figures

U.S. Patent

Oct. 9, 1979

4,170,363

OIL SCRAPER

This invention relates to a scraper ring for removing oil from a cylindrical surface which reciprocates rectilinearly in the direction of the axis of the cylindrical surface relative to the scraper ring.

Such a scraper ring may be used, for example, for removing oil from a piston rod of a double-acting piston arranged in an engine.

One object of the present invention is to provide a scraper ring which can be capable of satisfactory performance during long intervals between services. Thus the scraper ring should be able to maintain its function even after substantial wear.

According to the present invention there is provided a scraper ring for removing oil from an oil-coated cylindrical surface which reciprocates rectilinearly in the direction of the axis of the cylindrical surface relative to the scraper ring, the latter being made wholly or partially of material which is plastically deformable at normal working temperatures, the scraper ring having four co-axially disposed annular surfaces, namely an outer peripheral surface, an inner frusto-conical surface, and two conically-tapering surfaces of which one is wider than the other, the wider one of the conically-tapering surfaces meeting the inner frusto-conical surface at an edge which is at the smallest diameter of the inner frusto-conical surface and constitutes one extremity of the scraper ring in the axial direction thereof.

The invention includes such a scraper ring in combination with a compression device comprising two elements movable relative to each other in the axial direction of the scraper ring, the latter being held between the said two elements, one of the two elements having an abutment surface complementary to and abutting the wider one of the conically-tapering surfaces of the scraper ring, the other one of the two elements having an abutment surface complementary to and abutting the other one of the conically-tapering surfaces of the scraper ring, and resilient means loading one of the two elements so that the scraper ring is subject to compressive force between the two elements.

Figure 2:
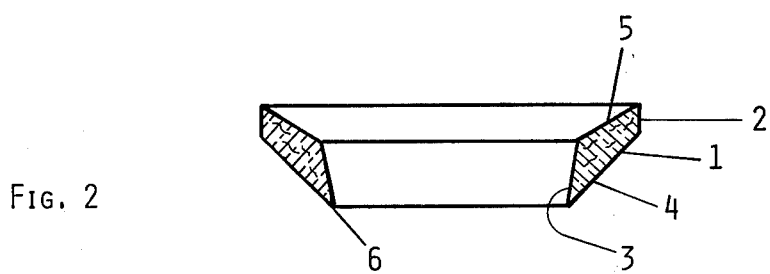

How the invention may be put into practice is described in more detail, with reference to the accompanying drawings, in which FIG. 1 shows in vertical section a scraper ring according to the invention mounted in combination with a compression device for removing oil from the surface of a piston rod, and FIG. 2 shows a vertical section of the scraper ring alone.

FIG. 2 represents an oil scraper ring 1 made of fibre glass reinforced polytetrafluoroethylene (PTFE) which is plastically deformable at normal working temperatures.

The scraper ring 1 has four co-axially disposed annular surfaces, namely an outer peripheral surface 2 an inner frusto-conical surface 3, and two conically-tapering surfaces 4, 5 of which one 4 is wider than the other 5, the wider one 4 of the conically-tapering surfaces meeting the inner frusto-conical surface 3 at an edge 6 which is at the smallest diameter of the inner frusto-conical surface 3 and constitutes one extremity of the scraper ring in the axial direction thereof.

FIG. 1 represents the scraper ring 1 in combination with a compression device comprising two elements 7, 8 movable relative to each other in the axial direction of the scraper ring 1, the latter being held between the said two elements 7, 8, one of the two elements having an abutment surface complementary to and abutting the wider one 4 of the conically-tapering surfaces of the scraper ring 1, the other one 8 of the two elements having an abutment surface complementary to and abutting the other one 5 of the conically-tapering surfaces of the scraper ring 1, and resilient means 9 loading one 8 of the two elements 7, 8 so that the scraper ring 1 is subject to compressive force between the two elements 7, 8.

The element 7 is in the form of a surrounding sleeve. The element 8 is in the form of a spring support ring which is loaded by resilient means 9 in the form of Belleville springs stressed by means of a screw-threaded ring 10 screwed into the sleeve 7. The abutment surfaces on the sleeve 7 and the support ring 8 have tapers corresponding to those of the surfaces 4 and 5 respectively so that there is contact over substantially the full width of each surface 4 or 5.

The lower part of the sleeve 7 has a central opening 12 of a diameter which only slightly exceeds that of a piston rod 11 extending through the sleeve 7, the ring 1, the support ring 8, the springs 9, and the ring 10.

During operation the piston rod 11 reciprocates rectilinearly in the direction of the axis of its cylindrical surface relative to the scraper ring 1, while the scraper ring 1 and elements 7–10 remain stationary. The lower part of the rod 11 is oil-covered, and the scraper ring 1 serves to remove oil from the part of the rod 11 moving upwards therethrough.

Due to the different taper angles of the surfaces on the sleeve 7 and the support 8 and due to the force continuously exerted by the springs 9 the ring 1 will be squeezed downwardly and inwardly towards the surface of the rod 11.

The surface 4 of the ring 1 has such a taper angle that wear of the ring 1 near the edge 6 allows the material of the ring 1 near the surface 4 to flow plastically at normal working temperatures in the direction towards the edge 6 sufficiently to maintain this edge 6 in adequate contact with the piston rod 11 in spite of wear of the ring 1 during operation.

The taper angle of the surface 5 is less, and the tendency to flow of the material of the ring 1 near the surface 5 in the direction towards the central axis will be much less than that of the said material near the surface 4. Consequently the frusto-conical shape of the surface 3 will remain substantially intact even after wear and deformation of the ring 1 allows the spring support ring 8 to move a little closer to the opening 12.

What is claimed is:

1. A scraper ring for removing oil from an oil-coated cylindrical surface which reciprocates rectilinearly in the direction of the axis of the cylindrical surface in combination with an assembly of elements axially disposed alongside said cylindrical surface, comprising, a body formed at least in part of plastically deformable material at normal working temperatures and exhibiting a long wear characteristic to contact and motion thereagainst of said reciprocating cylindrical surface, said body formed of four co-axially disposed annular surfaces comprising an outer peripheral surface, an inner frusto-conical surface tapering away from said cylindrical surface to form an edge which constitutes the smallest diameter and is disposed at an axial extremity of the body to register against said reciprocating cylindrical surface and scrape oil therefrom, two conically-tapering surfaces joining the inner and outer surfaces with one such surface meeting said edge being wider than the other thereby to present a taper angle on the surface near said edge of the ring that permits the ring when under pressure from the opposing surface to flow plastically at said normal working temperatures in the direction toward the edge sufficiently to keep said edge in contact with said reciprocating surface under substantial wear, a retainer element contacting said ring with a surface adjacent to and substantially mating with said wider conically tapering surface, and resilient means holding said ring against said retainer element.

2. A ring assembly as defined in claim 1, wherein said resilient means comprises at least one Belleville spring, and threaded means mating with said retainer element to produce a preload stress on said resilient means.

3. A ring assembly as defined in claim 1 including a support ring with a conically tapered surface substantially mating with said other of said two conically tapering surfaces of the scraper ring, said support ring being disposed between said resilient means and said scraper ring.

* * * * *